(12) United States Patent
Sumrall

(10) Patent No.: US 9,203,903 B2
(45) Date of Patent: Dec. 1, 2015

(54) PROCESSING A REQUEST TO MOUNT A BOOT VOLUME

(71) Applicant: International Business Machines Corporation, Armonk, NY (US)

(72) Inventor: Anthony C. Sumrall, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

(21) Appl. No.: 13/726,842

(22) Filed: Dec. 26, 2012

(65) Prior Publication Data

US 2014/0181238 A1 Jun. 26, 2014

(51) Int. Cl.
*G06F 13/00* (2006.01)
*H04L 29/08* (2006.01)
*G06F 3/06* (2006.01)
*G06F 21/00* (2013.01)
*G06F 17/30* (2006.01)

(52) U.S. Cl.
CPC .............. *H04L 67/1097* (2013.01); *G06F 3/06* (2013.01); *G06F 17/30194* (2013.01); *G06F 21/00* (2013.01)

(58) Field of Classification Search
CPC .............. H04L 29/06; H04L 29/08072; H04L 29/08549; H04L 29/08801; G06F 3/067; G06F 3/00; G06F 3/06; G06F 21/00; G06F 17/30194
USPC .................................................. 709/203, 216
See application file for complete search history.

(56) References Cited

U.S. PATENT DOCUMENTS

| 6,141,778 | A  | 10/2000 | Kane et al. |
| 8,291,186 | B2 | 10/2012 | Chauvet et al. |
| 2006/0294127 | A1 | 12/2006 | Nettles |
| 2007/0089107 | A1 | 4/2007 | Squires et al. |
| 2008/0028143 | A1 | 1/2008 | Murase |
| 2009/0089794 | A1 | 4/2009 | Hilton |
| 2011/0072433 | A1 | 3/2011 | Laviolette |
| 2011/0099289 | A1 | 4/2011 | Poggesi et al. |
| 2011/0173640 | A1 | 7/2011 | Kreuzenstein et al. |
| 2011/0282846 | A1 | 11/2011 | Shepard et al. |
| 2012/0016840 | A1 | 1/2012 | Lin et al. |
| 2012/0110154 | A1 | 5/2012 | Adlung et al. |
| 2012/0296960 | A1 | 11/2012 | Kreuzer et al. |
| 2012/0311260 | A1 | 12/2012 | Yamagiwa et al. |

FOREIGN PATENT DOCUMENTS

EP      1686492 A1    8/2006

OTHER PUBLICATIONS

"International Search Report and the Written Opinion", International Application No. PCT/CN2013/087922, Feb. 11, 2014.

*Primary Examiner* — Robert B Harrell
(74) *Attorney, Agent, or Firm* — Reza Sarbakhsh; Steven Chiu

(57) ABSTRACT

A mechanism is provided for providing access to mainframe-based data in a non-mainframe format. A host computer system receives a request from a client system to mount a dataset on a data storage device controlled by the host computer system as a data volume on the client system. The host system verifies the client system's authority to mount the requested dataset. The dataset is mounted as the data volume on the client system. The dataset, after mounting, behaves as native to the client system. Subsequent input/output (I/O) requests associated with the mounted dataset are processed by the host computer system.

21 Claims, 4 Drawing Sheets

PROCESSING A REQUEST TO MOUNT A BOOT VOLUME

BACKGROUND

The disclosure relates generally to computer systems, and more specifically to execution of operations, such as I/O (input/output) operations, for one computer architecture on another computer architecture.

An IBM System z® computer is a product line of large computer servers or mainframes based on the z/Architecture® provided by International Business Machines Corporation (IBM®) of Armonk, N.Y. IBM System z® computers can utilize a derivative of the Multiple Virtual Storage (MVS) operating system, which is a robust mainframe operating system utilized by many generations of IBM® mainframe computers. Derivatives of the MVS™ operating system can include the OS/390® operating system and IBM z/OS® (IBM System z®, z/Architecture®, IBM®, OS/390® and IBM z/OS® are registered trademarks of International Business Machines Corporation, located in Armonk, N.Y.).

There are numerous heterogeneous operating environments for jobs, applications or other processes. Typically, each of these operating environments include different, and often incompatible, combinations of hardware, operating system, and application software. For example, in addition to a mainframe computer utilizing z/OS operating system, the heterogeneous system may include computers running various operating systems such as UNIX, Windows, Linux, and the like. Significant amounts of data may be spread across multiple computer systems. This means that in such heterogeneous operating environments there are multiple mechanisms for managing access and for maintaining/restoring distributed data. Therefore, it would be desirable to provide a more efficient method of accessing and/or maintaining data. Preferably, such method should have minimal impact on the operation of the heterogeneous operating environments.

SUMMARY

In one aspect, a method for providing access to mainframe-based data in a non-mainframe format is provided. The method comprises receiving, at a host computer system, a first request from a client system. The first request includes a request to mount a dataset on a data storage device controlled by the host computer system as a data volume on the client system. The method further comprises, in response to receiving the request to mount the dataset, the host system verifying the client system's authority to mount the requested dataset. The method further comprises mounting the dataset as the data volume on the client system. The dataset, after mounting, behaves as native to the client system. The method further comprises processing subsequent I/O requests associated with the mounted dataset.

In another aspect, a computer program product for providing access to mainframe-based data in a non-mainframe format is provided. The computer program product comprises one or more computer-readable tangible storage devices and a plurality of program instructions stored on at least one of the one or more computer-readable tangible storage devices for execution by at least one of one or more processors. The plurality of program instructions comprises program instructions to receive, at a host computer system, a first request from a client system. The first request comprises a request to mount a dataset on a data storage device controlled by the host computer system as a data volume on the client system. The plurality of program instructions further comprises program instructions to verify the client system's authority to mount the requested dataset. The plurality of program instructions further comprises program instructions to mount the dataset as the data volume. The dataset after mounting behaves as native to the client system. The plurality of program instructions further comprises program instructions to process a second request from the client system. The second request comprises an I/O request associated with the mounted dataset.

In yet another aspect, a computer system for providing access to mainframe-based data in a non-mainframe format is provided. The computer system comprises one or more processors, one or more computer-readable tangible storage devices, and a plurality of program instructions stored on at least one of the one or more storage devices for execution by at least one of the one or more processors. The plurality of program instructions comprises program instructions to receive, at a host computer system, a first request from a client system. The first request comprises a request to mount a dataset on a data storage device controlled by the host computer system as a data volume on the client system. The plurality of program instructions further comprises program instructions to verify the client system's authority to mount the requested dataset. The plurality of program instructions further comprises program instructions to mount the dataset as the data volume. The dataset after mounting behaves as native to the client system. The plurality of program instructions further comprises program instructions to process a second request from the client system. The second request comprises an I/O request associated with the mounted dataset.

DETAILED DESCRIPTION

Embodiments of the present invention will now be described with reference to the figures. Embodiments of the present invention apply equally to all forms of large computer servers including mainframes. However, focus is directed to IBM System z® computers by means of example and explanation in the description of embodiments of the present invention.

As used herein, the term "operating system" refers to a set of supervisory routines for controlling the operating of a computing system, including one or more of the following major functions: task management, storage management, input/output management, and data management. An "application program", as used herein, refers to a program written to do a user's work, usually in a high-level language, and is loaded into main storage and executed under the supervision of the operating system's task manager. As used herein, the term "volume" refers to a certain portion of data, together with at least a portion of its data carrier (such as a drum, a disk pack, a disk storage module, and the like) that can be conveniently handled as a unit. It should be noted that the term "volume" includes any type or form of physical, logical, or virtualized volume.

Among other things, operating systems manage the use by application programs of various system resources such as data files (i.e. datasets), executable program files, hardware resources such as processors and memory, and the like. Operating systems use file systems to organize data and program files so that they may be accessed by applications. In a hierarchical file system, files are logically contained in directories, each of which may be either a root directory or a subdirectory contained in a parent directory. In general, each directory may contain zero or more subdirectories and zero or more files.

Figure 1:
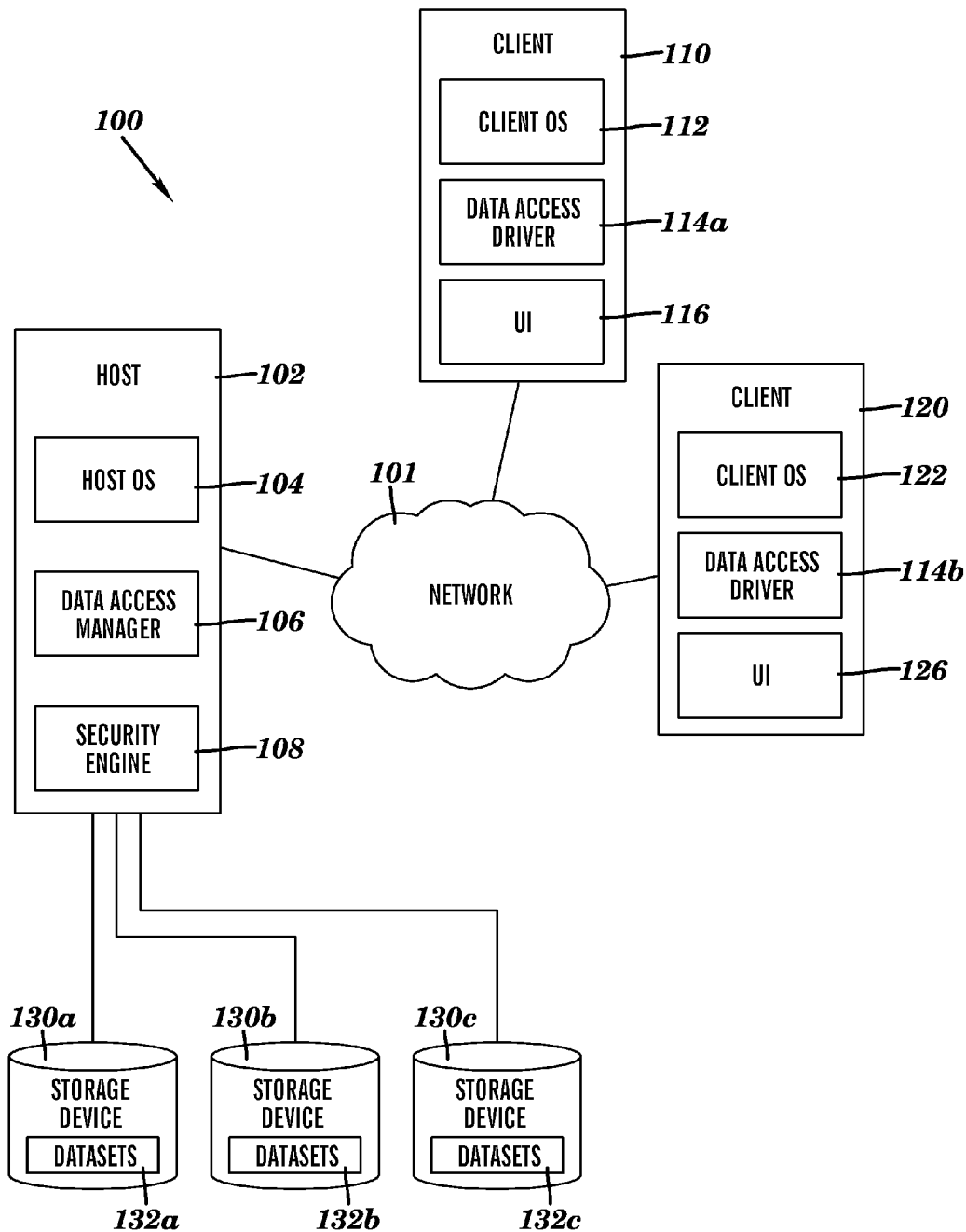
FIG. 1 is an illustration of a distributed data processing environment in which an embodiment of the present invention can be implemented.

However, in a distributed data processing environments, such as the environment depicted in FIG. 1, there may be a plurality of homogeneous data storage devices that may be physically located on different computer systems and may be controlled by different operating systems. Thus, to fully specify one of the files, a user would have to identify not only the location of the file within its file system (using, for example, a path name), but also the file system (using, for example, a drive letter) as well. To avoid this need to specify a file system, most of the contemporary operating systems employ a concept known as mounting, in which an entire first file system may be placed (or "mounted") with its hierarchical tree structure intact, for example, in a directory of a second file system, so that all files can be referenced from within a single file system.

The mount operation would typically be initiated by a script or program that runs during the start up of the operating system or by a system administrator entering, for example, a command (e.g., mount command) from a keyboard of an operator console or one of the client computer systems described below in conjunction with FIG. 1. To reverse the mount operation, the process of shutting down the computer system, the administrator or the user would enter, for example, another command (e.g. unmount command).

To summarize, in the context of various embodiments of the present invention, mounting a first file system on a first computer system logically associates it with a second computer system so that it can be referenced by the second computer system. The term "mount operation", as used generically herein, refers to this operation, as well as any other operation that changes the logical association of a first file system on a first computer system with a second computer system.

In one general embodiment, a distributed data processing environment may include a data storage device having data stored therein. A host computer system is in communication with the data storage device. The host computer system has resident thereon a controlling operating system. The distributed data processing environment may further include one or more client computer systems in communication with the host computer system. Each of the client computer systems may have resident thereon a client operating system, which may be different from the host computer system's operating system. According to an embodiment of the present invention, a volume on the data storage device may be under logical control of the operating system running on the host computer system. The volume on the data storage device may contain a plurality of datasets.

According to an embodiment of the present invention, one or more of the plurality of datasets on the data storage device may be mounted as an entire data volume on the client system. The dataset, after mounting, behaves as native to the client system. For example, the dataset may store data in a format native to the client system. Advantageously, the host computer system's data access security mechanism may control access to the mounted volume on the client system. Furthermore, various embodiments of the present invention facilitate optimized method of maintaining heterogeneous data without having any significant impact on the operation of the heterogeneous distributed data processing environment. In other words, the heterogeneous distributed data processing system presented herein is an integration of data storage resources, such that the resources, although heterogeneous, are federated and logically integrated by a single point of control under a single administrative and management model (e.g., the model of the z/Enterprise System™ offered by International Business Machines Corporation, Armonk, N.Y.).

FIG. 1 is an illustration of a distributed data processing environment in which an embodiment of the present invention can be implemented. FIG. 1 shows one example of an operating environment applicable to various embodiments of the present invention and is not intended to imply any limitation with regard to the environments in which different embodiments may be implemented. Many modifications to the depicted environments may be made.

In one embodiment, a distributed data processing system 100 may include a network 101, a host computer system 102, client computers 110 and 120 coupled to the host computer system 102 via the network 101, and a plurality of storage devices 130a,b,c coupled, for example, to the network 101 or directly to the host computer system 102. The host computer system 102 may comprise a large computer server, such as an IBM® System z® mainframe computer (offered by International Business Machines Corporation, Armonk, N.Y.), operating according to the IBM® z/Architecture, although the present embodiment can be implemented in other forms of large computer servers. The host computer system 102 may be optimized to host large-scale transaction, and mission critical applications. It may include, for instance, one or more processors (CPUs), which may execute a host operating system 104, such as the z/OS® operating system offered by International Business Machines Corporation. The host computer system 102, in one embodiment, runs a data access manager program 106 that manages data stored on the storage devices 130a,b,c and access thereto. The host computer system 102 may also run a security engine 108 that manages the security of the data. The data access manager 106 and the security engine 108 are discussed in greater detail below.

Network 101 represents a worldwide collection of networks and gateways to communicate with one another. Network 101 can be, for example, an intranet, a local area network (LAN), a wide area network (WAN), a wireless local area network (WLAN), a synchronous optical network (SONET), and the like. Network 101 may include communication connections, such as wire, wireless communication links, or fiber optic cables.

In an embodiment of the present invention, the host computer system 102 may be connected, for example via the network 101, to a plurality of large scale storage devices 130a-c, such as direct access storage devices (DASD) located externally to the host computer system 102. In an alternative embodiment, the plurality of DASDs 130a-c may be directly connected to the host computer system 102 according to a protocol such as Enterprise Systems Connection (ESCON), Fiber Connectivity (FICON), Small Computer System Interface (SCSI), and the like. Mainframe files or "datasets" 132a-c, for example under z/OS® operating system, are allocated space on DASD devices 130a-c in one or more contiguous groups of tracks.

Additionally, DASD devices 130a-c used under, for example, z/OS® operating system may contain a VTOC (Volume Table of Contents) (shown in FIG. 2), and optionally a VTOCIX (VTOC Index) and VVDS (VSAM Volume Data Set). VSAM stands for virtual storage access method.

In the depicted example, client computers 110 and 120 may be, for example, a netbook, laptop computer, tablet computer, desktop computer, or any type of computing devices capable of executing software in accordance with the embodiments described herein. In various embodiments of the present invention, client computers 110 and 120 may have resident thereon any of various operating systems, such as Windows, Mac OS, Linux, Unix, and the like. For example, the client computer 110 may be running Windows operating system 112 while the client computer 120 may be running Linux operating system 122. Client computers 118 and 120 may contain user interfaces (UIs) 116 and 126, respectively. UIs 116 and 126 can be, for example, graphical user interface (GUI) or web user interfaces (WUI).

In addition, client computers 110 and 120 may have various applications installed on or available to each computer. For example, an application can be an email client, web browser, web application, and the like. Applications running on client computers 110 and 120 may include, for example, data access driver programs 114a and 114b, respectively. In an embodiment of the present invention, the data access driver programs 114a and 114b may be configured to communicate with the data access manager 106 running on the host computer system 102. The data access driver programs 114a,b and the data access manager program 106 may collectively manage application data and access thereto. The data access manager 106 and the data access drivers 114a,b are discussed in greater detail below.

As will be discussed with reference to FIG. 4, the client computer 110 includes internal components 800a and external components 900a and client computer 120 includes internal components 800b and external components 900b. For simplicity purposes, only two client computers 110 and 120 are shown in FIG. 1, although in other embodiments, distributed data processing system 100 can include additional client computers.

Figure 2:
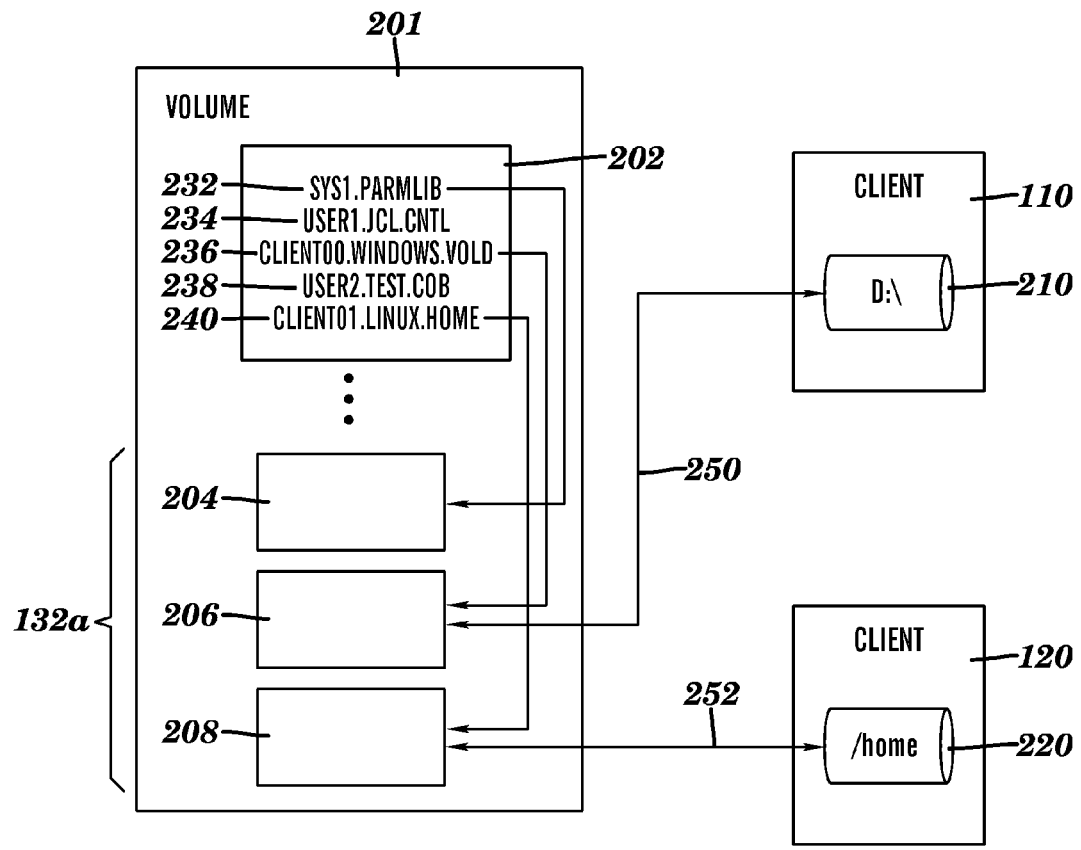
FIG. 2 is a block diagram representation of mounting a dataset on a data storage device controlled by a host computer system as a data volume on a client system in accordance with an embodiment of the present invention.

FIG. 2 is a block diagram representation of mounting a dataset which resides on a data storage device controlled by the host computer system as a data volume on the client system in accordance with an embodiment of the present invention. One exemplary volume 201 that may be contained within one DASD, such as the DASD 130a, is shown in FIG. 2. It will be understood that the volume 201 shown could be any type or form of physical, logical, or virtualized volume residing on a magnetic disk, magnetic cylinder media, optical disk media or similar direct access storage media. In one embodiment of the present invention, the volume 201 may contain a subset of the data being used by the host computer system 102, as well as one or more client computer systems, for example, client systems 110 and 120. Data contained on the volume 201 may be distributed between multiple data sets 132a as described below. It should be noted that if the volume 201 is implemented as a virtualized volume, the datasets contained on the volume 201 may span across multiple physical data storage devices.

Entries related to a dataset in a particular volume stored on a storage device, whether the volume is VSAM or non-VSAM are maintained by the host operating system 104 in a volume table of contents, such as a VTOC 202 stored within the volume 201. Each VTOC entry 232-240 includes vital information about the format and location of the corresponding dataset in the volume. For a dataset in a VSAM volume, an entry of additional vital information may be maintained in a VSAM Volume Data Set (VVDS) and stored with the volume. To access a non-VSAM dataset, the information in the VTOC entry 232-240 is required. To access a VSAM dataset, the information in the VVDS is required. For illustrative purposes only, assume that the volume 201 contains only non-VSAM datasets.

As shown in FIG. 2, one of the entries in the VTOC 202, more specifically entry 232 may contain vital information about a configuration file such as the SYS1.PARMLIB containing system variables and other configuration parameters. Among the vital information included in the entry 232 may be a pointer to the location 204 of the dataset in the volume 201. Some dataset entries in the VTOC 202, such as entries 234 and 238, may contain information about data used by two or more jobs running on the host computer system 102, for example, USER1.JCL.CNTL and USER2.TEST.COB, respectively. It should be noted that different users of the host computer system 102 may have different security credentials to access any particular dataset.

According to an embodiment of the present invention, the data access manager program 106 and the data access driver programs 114a-b may enable mounting a dataset which resides on a volume, such as the volume 201 shown in FIG. 2, of a data storage device controlled by the host computer system, such as the host computer system 102, as a data volume on the client system, such as client systems 110 and 120. For example, as discussed in greater detail below, the data access driver program 114a running on the client system 110 under control of Windows operating system 112 may send a request to the data access manager 106 to mount a particular dataset on the volume 201 as a data volume, for instance data volume "D:\" 210 on the client system 110. In accordance with an embodiment of the present invention, in response to receiving such mount request, the data access manager program 106 may verify that the client system 110 has authority (permission) to access the requested dataset. If the client system 110 has authority to access the requested dataset, the data access manager program 106 may grant such request. As a result, the data access manager program 106 may associate a dataset storing location 206 pointed to by the "CLIENT00.WINDOWS.VOLD" entry 236 with the logical volume "D:\" 210 on the client system 110. This association is depicted by the arrow 250.

In an embodiment of the present invention, to keep track of information needed to manage multiple logical associations, the data access manager program 106 may maintain, for example, virtualization information. Specific form and amount of virtualization information may be implementation dependent. By way of example and not limitation, virtualization information may reside in a virtualization table maintained by the data access manager program 106. In such implementation, the data access manager program 106 may logically associate a mounted dataset with the corresponding data volume on a client system by updating a corresponding entry in the virtualization table.

For example, in the process of mounting the dataset, the data access manager program 106 may update the corresponding virtualization table entry with information such as, but not limited to, the assignment, the current or last operation, the time that the last request was received/processed. For example, the virtualization table entry may indicate that the dataset "CLIENT00.WINDOWS.VOLD" is assigned to the client 110, the last operation was "mount," and the last request was processed at a particular time on a particular day. It should be noted that once mounted, the exemplary volume "D:\" 210 may behave as native to the client system 110. In other words, the mounted volume 210 may be, for example, formatted by the client operating system 112 running on the client system 110. In addition, any application running under control of the client operating system 122 on the client system 100 may access the "CLIENT00.WINDOWS.VOLD" dataset, known to the client system 100 as volume "D:\" 210, granted that the application has appropriate level of authority.

On the other hand, the dataset "CLIENT00.WINDOWS.VOLD" may also be manipulated by an application running on the host computer system 102. For example, a backup job running on the host computer 102 may access the "CLIENT00.WINDOWS.VOLD" dataset in order to backup or restore data stored therein, granted the backup job has sufficient authority level. The mechanism described above advantageously facilitates integration of heterogeneous data storage resources by a single point of control under a single administrative and management model.

In a similar manner, as shown in FIG. 2, a dataset storing location 208 pointed to by the "CLIENT01.LINUX.HOME" entry 240 may be associated with the volume "/home" 220 on the client system 120 having a different operating system 122 (i.e. Linux) installed and running thereon. This association is depicted by the arrow 252. Accordingly, the data access manager program 106 may update a corresponding virtualization table entry with information about the assignment to the client system 120 of the dataset "CLIENT01.LINUX.HOME". Once mounted, the exemplary volume "/home" 220 may behave as native to the client system 120.

Figure 3:
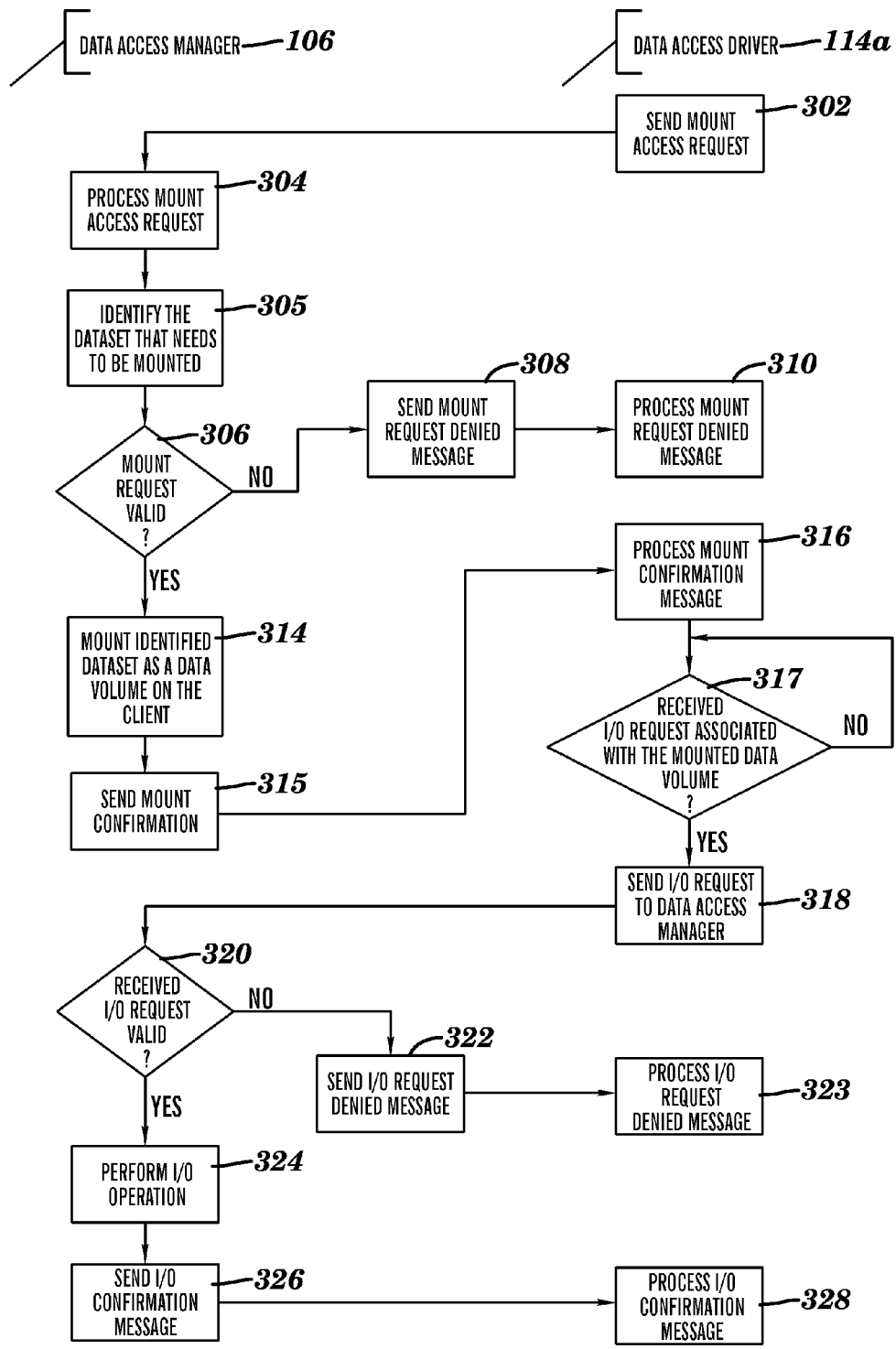
FIG. 3 illustrates steps performed by the data access manager program running on a host computer system and the data access driver program running on a client system to provide access to a dataset on the data storage device controlled by the host computer system, according to an embodiment of the present invention.

FIG. 3 illustrates steps performed by the data access manager program running on a host computer system and the data access driver program running on a client system to provide access to a dataset on the data storage device controlled by the host computer system, according to an embodiment of the present invention. For the sake of simplicity of illustration only steps performed by data access driver program 114a running on one of the client systems (i.e. client system 110) and the data access manager program 106 running on the host system are shown in FIG. 3 and described below. However, similar steps may be performed by any other data access driver program running on any other client system.

The data access manager program 106 and the data access client program 114a may communicate using one of many different communication protocols (e.g., TCP or UDP). In a preferred embodiment, a secure communication protocol (e.g., SSL) may be employed for all communication between the data access manager program 106 and the data access client program 114a. In an embodiment of the present invention, the client operating system 112 may load the data access driver program 114a, for example, during a system startup procedure. Similarly, during startup, initialization, or at any other appropriate time, a job manager running on the host computer system 102 may load the data access manager program 106 into a memory. Once both data access manager 106 and data access driver 114a are running they may perform a handshake communication, in accordance with an embodiment of the present invention.

According to an exemplary embodiment, at 302, in response to receiving a mount command, a data access driver, such as the data access driver program 114a running on the client system 110 may send a mount request to the data access manager 106 for a user specified volume, such as volume "D:\" 210 on the client system 110, to be logically associated with a dataset on the host computer system 102. In an embodiment of the present invention, the mount request may be sent in the form of specialized packets. By way of example and not limitation, the following parameters may be utilized in the specialized packets: request, token, client volume ID, client ID and the like.

At 304, the data access manager 106 may process the received request. For example, the data access manager 106 may parse the parameters included in the specialized packets. In an embodiment of the present invention, a request parameter may include, for example, request identification information indicating that the received request is a mount request. In addition, the data access driver program 114a may include authentication information (i.e., password, access code, and the like) in the request parameter when sending a mount request (at 302). The data access manager program 106 may use the authentication information when connecting to a security engine, as described below. In a preferred embodiment, the authentication information may be encrypted or otherwise obfuscated. Next, the data access manager 106, at 305, may identify the dataset that needs to be mounted based on the received parameter values included in the mount access request.

In one embodiment of the present invention, the data access manager program 106 may identify the dataset to be mounted based on the received token parameter value included in the received mount request. It should be noted that the value of the token parameter may be implementation dependent. For example, the value of the token may be selected at implementation and/or configuration time based on a desired level of security. In one embodiment, the token parameter may represent a dataset name that client system 110 attempts to mount. In an alternative embodiment, the token parameter may represent a predetermined value that could be associated with the actual dataset name by the data access manager 106. In such embodiment, the data access manager 106, in response to receiving and parsing the token value may use, for example, a lookup table loaded into memory of the host computer system 102 to determine a corresponding dataset name. The lookup table may contain a mapping of a plurality of predetermined values to a plurality of dataset names being managed by the data access manager 106. It should be noted that information about available token values may be exchanged between the data access manager 106 and the data access driver program 114a during, for example, handshake communication.

In yet another alternative embodiment, the data access driver program 114a, instead of specifying a token value, may use a client volume ID parameter. The client volume ID parameter may be used by the data access manager 106 to determine which dataset to use. It should be noted that if the data access driver program 114a includes both the token and client volume ID values, the data access manager 106 may either ignore the client volume ID value and use only token value or the data access manager 106 may use the client volume ID value to validate the association between the token value and the determined dataset name.

At 306, the data access manager 106 may determine whether the received mount request is valid. In one embodiment of the present invention, the data access manager 106 may validate the mount request with the security engine. For example, one of the most commonly used security engines for mainframe computers is the Resource Access Control Facility (RACF) provided by International Business Machines Corporation (IBM). The RACF employs controlling software on a mainframe computer associated with a RACF database.

The RACF not only controls access to the data storage devices, but also controls the level or amount of access allowed to a user. Typically, in the RACF security engine, a unique RACF user identifier is assigned to each user. Each RACF user identifier has a unique password to verify the identity of the user requesting access to the mainframe computing system.

The RACF enables organizations to define individuals and groups who use the system that the RACF protects. For example, a group may be defined that encompasses a collection of individuals having common needs and requirements. The RACF also enables a system administrator to define authority levels for a user or a group of users. The authority levels control what a user or member of a group can do on the system. The RACF also protects the system's resources, protecting an organization's information stored on the system by controlling which users have authority to access a system resource, such as a data volume or a dataset.

The RACF stores all information about users, groups and resources in user, group and resource profiles. A profile is a record of RACF information that has been defined by a security administrator. A user profile provides user attributes that describe the system-wide and group-wide access privileges to protected resources for a user. Similarly, a group profile defines the authority that a user who is a member of the group has to access resources belonging to the group. A resource profile defines the type of authority a user needs to access a specific resource. A resource profile may contain an access list as well as a default level of access authority for the resources the profile protects. An access list identifies the access authorities of specific users and groups, while the default level of access authority applies to any user not specifically included in the access list. While an exemplary RACF engine is discussed and depicted for purposes of illustration throughout, the security engine may be any known security engine in the art.

Referring back to FIG. 3, in an embodiment of the present invention, at 306, the data access manager 106 may generate and send a security command (i.e., RACF command) to the security engine 108. The security command may include, for example, an access list identifying access authorities of specific users and/or groups that need to access the dataset requested to be mounted. In an embodiment of the present invention, the access list may be passed to the data access manager 106 by the data access driver program 114a as, for example, a client ID parameter included in the mount request.

If the security engine 108 determines that the requesting user (or user group) has no authority to access (mount) the requested dataset (decision 306, no branch), then the data access manager 106, at 308, may send a response to the data access driver program 114a indicating that the mount request has been denied due to, for example, insufficient privileges. In response to receiving the mount request denied communication message, at 310, the data access driver program 114a, may process such message and may, for example, display a corresponding error message on the user console, by employing for example, a UI 116. If, on the other hand, the security engine 108 determines that the requesting user (or user group) has sufficient authority level to access (mount) the requested dataset (decision 306, yes branch), then the data access manager 106, at 314, may mount the identified dataset as a data volume on the client system 110.

In one embodiment of the present invention, the data access manager 106 may, for example, update virtualization information logically associating the dataset location 206 pointed to by the "CLIENT00.WINDOWS.VOLD" entry 236 with the volume "D:\" on the client system 110. In an embodiment, this association may be represented by an entry in the virtualization table.

In an embodiment of the present invention, if the virtualization information update was successfully performed, the data access manager program 106, at 315, may send a mount confirmation message to the data access driver program 114a indicating that the mount operation has been performed. In response to receiving the mount confirmation message, at 316, the data access driver program 114a may process the confirmation message. For example, the data access driver program 114a may selectively grant access to the mounted volume "D:\" to various applications and/or users of the client system 110. As previously indicated, even though the mounted volume, such as the volume "D:\" 210, may be logically associated with the dataset on the host system 102, it may functionally behave as native to the client system 110. At least in some embodiments, the mounted volume "D:\" 210 may be a bootable volume.

According to an embodiment of the present invention, subsequently to processing the mount confirmation message, the data access driver program 114a may start monitoring the I/O requests to the mounted volume 210. If the data access driver program 114a determines that the received I/O request is not associated with the mounted volume 210 (decision 317, no branch), then the data access driver program 114a may disregard such request and continue the monitoring process. If, on the other hand, the data access driver program 114a determines that the received I/O request has the mounted volume 210 as either the source or target of the data access operation (decision 317, yes branch), then the data access driver program 114a, at 318, may forward the I/O request to the data access manager program 106. In an embodiment of the present invention, the forwarded I/O request may include information identifying the type of the request (for example, read, write, seek, and the like) among other information needed for the data access manager 106 to carry out the request (for example, byte offset in the volume or from the start or end or current position to seek to, data to be written, length, and the like).

In response to receiving the I/O request from the data access driver program 114a, at 320, the data access manager program 106 may determine whether the received I/O request is valid. In one embodiment of the present invention, the data access manager 106 may validate the I/O request with the security engine 108. Depending on a particular security configuration, the data access manager 106 in concert with the security engine 108 may determine whether the particular user (i.e. application running on the client system 120) trying to access data on the mounted volume 210 has sufficient authority for such operation. If the security engine 108 determines that the user does not have the required authority (decision 320, no branch), the data access manager program 106, at 322, may send, for example, an I/O request denied message back to the data access driver program 114a. In response to receiving such message, at 323, the data access driver program 114a may process the message accordingly. For example, the data access driver program 114a may send a corresponding error code to the application requesting to perform the I/O operation.

On the other hand, if the security engine 108 determines that the user does have sufficient authority (decision 320, yes branch), the data access manager program 106 may perform, at 324, the requested I/O operation. In other words, at 324, the data access manager program 106 may access data in the mounted dataset logically associated with the mounted volume 210 on the client system 110 and carry out the request operation. At the completion of the operation the data access manager program 106, at 326, may send an I/O request confirmation message indicting a status (i.e. success or failure) of the carried out I/O operation. In response to receiving the I/O request confirmation message, the data access driver program 114a, at 328, may process the received I/O request confirmation message. In an embodiment of the present invention, processing the I/O request confirmation may include forwarding the status of the requested I/O operation to the requesting application on the client system 110.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device, partly on the user's computing device, as a stand-alone software package, partly on the user's computing device and partly on a remote computing device or entirely on the remote computing device or server computer. In the latter scenario, the remote computing device may be connected to the user's computing device through any type of network, including a local area network (LAN) or a wide area network (WAN), or the connection may be made to an external computing device (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, mobile device or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computer or other programmable apparatus provide processes for implementing the functions/acts specified in the flowchart and/or block diagram block or blocks.

Figure 4:
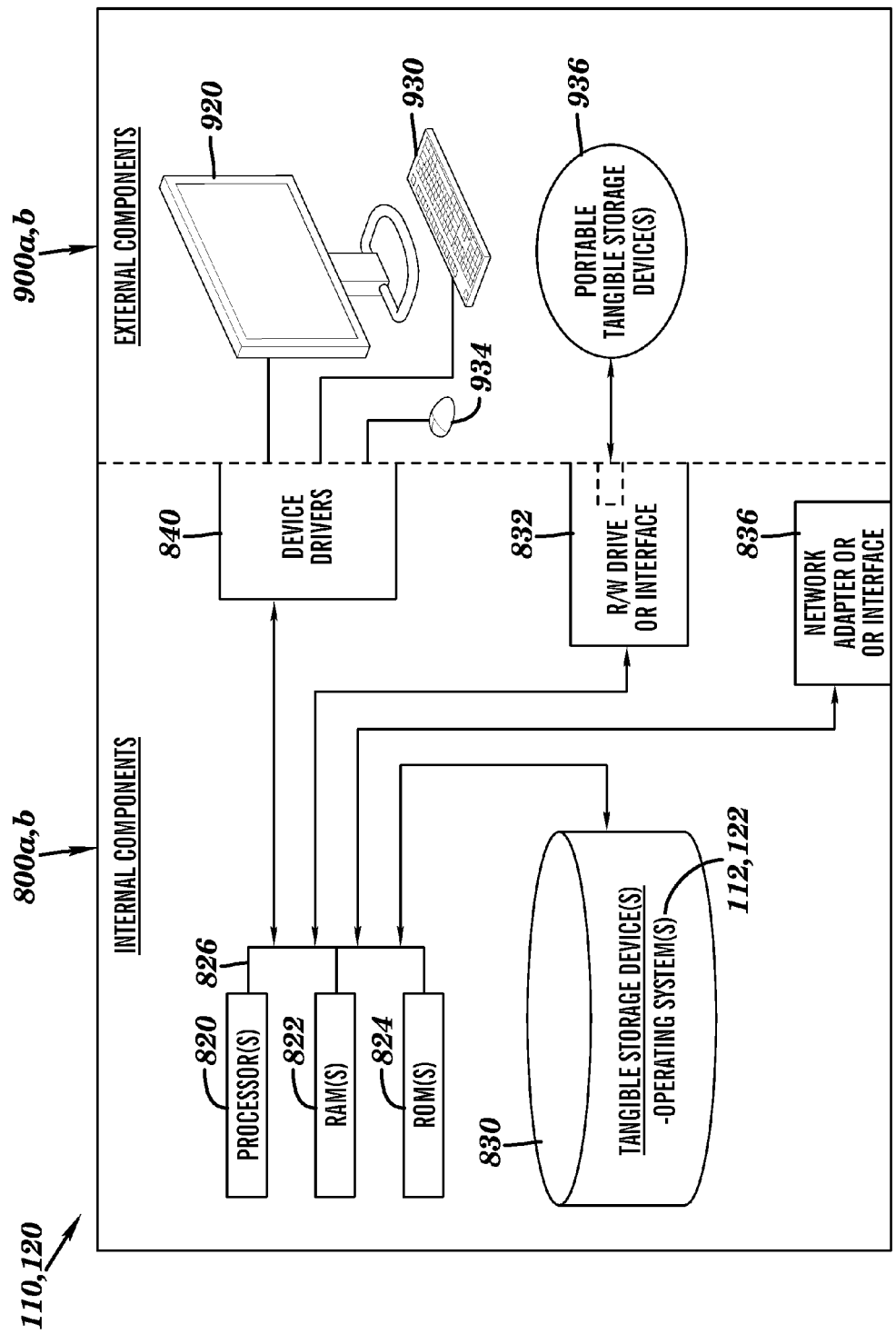
FIG. 4 is a block diagram of internal and external components of each of the client computers of FIG. 1.

Referring now to FIG. 4, a block diagram of internal and external components of each of the client computers of FIG. 1, computers 110 and 120, include respective sets of internal components 800a, b and external components 900a, b. Each of the sets of internal components 800a, b includes one or more processors 820, one or more computer-readable RAMs 822 and one or more computer-readable ROMs 824 on one or more buses 826, one or more client operating systems 112, 122 and one or more computer-readable tangible storage devices 830. The one or more operating systems 112, 122 are stored on one or more of the computer-readable tangible storage devices 830 for execution by one or more of the processors 820 via one or more of the RAMs 822 (which typically include cache memory). Data access driver program 114a may be stored on one or more of the computer-readable tangible storage devices 830 of internal components 800a for execution by one or more of the processors 820 of internal components 800a via one or more of the RAMs 822 of internal components 800a. Data access driver program 114b may be stored on one or more of the computer-readable tangible storage devices 830 of internal components 800b for execution by one or more of the processors 820 of internal components 800b via one or more of the RAMs 822 of internal components 800b. In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Data access driver program 114a,b can be stored on one or more of the portable computer-readable tangible storage devices 936 of external components 900a,b read via R/W drive or interface 832 of internal components 800a,b and loaded into one or more computer-readable tangible storage devices 830 of internal components 800a,b.

Each set of internal components 800a,b also includes a network adapter or interface 836 such as a TCP/IP adapter card. Data access driver program 114a,b can be downloaded to computers 110 and 120 from an external computer via a network (for example, the Internet, a local area network or other, wide area network) and network adapter or interface 836 of internal components 800a,b. The network may comprise copper wires, optical fibers, wireless transmission, routers, firewalls, switches, gateway computers and/or edge servers.

Each of the sets of external components 900a,b includes a computer display monitor 920, a keyboard 930, and a computer mouse 934. Each set of internal components 800a,b also includes device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Data access manager program 106 and data access driver program 114a,b can be written in various programming languages including low-level, high-level, object-oriented or non object-oriented languages. Alternatively, the functions of data access manager program 106 and data access driver program 114a,b can be implemented in whole or in part by computer circuits and other hardware (not shown).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description above has been presented for illustration purposes only. It is not intended to be an exhaustive description of the possible embodiments. One of ordinary skill in the art will understand that other combinations and embodiments are possible.

What is claimed is:

1. A method for securely distributing boot volume datasets stored on a host computer system, the method comprising:
   storing, by the host computer system, a boot volume dataset on a data storage device controlled by the host computer system, wherein the boot volume dataset comprises system files required by a designated client system to load an operating system, wherein the designated client system is registered with the host computer system according to a set of credentials;
   receiving, by the host computer system, a first request from the designated client system, the first request comprising a request to mount the boot volume dataset as a data volume on the designated client system, wherein the receiving is performed prior to the designated client system loading an operating system;
   verifying, by the host computer system, the designated client system's authority to mount the requested boot volume dataset based on the set of credentials;
   mounting, by the host computer system, the boot volume dataset as the data volume, the dataset after mounting behaving as native to the client system; and
   processing, by the host computer system, a second request from the designated client system, the second request comprising an input/output (I/O) request associated with the mounted dataset.

2. The method of claim 1, wherein the host computer system runs a first operating system and the designated client system runs a second operating system.

3. The method of claim 1, wherein processing the second request further comprises verifying, by the host computer system, that a user of the designated client system requesting to perform an I/O operation has sufficient authority level.

4. The method of claim 1, wherein mounting the boot volume dataset as the data volume further comprises updating, by the host computer system, a virtualization table entry associating the dataset with the data volume.

5. The method of claim 1, wherein the first request includes a parameter indicating a dataset name.

6. The method of claim 1, wherein the first request includes a parameter indicating a predetermined value that may be mapped by the host computer system to a specific dataset.

7. The method of claim 1, wherein the mounted dataset resides on a volume among datasets storing data in different formats.

8. A computer program product for securely distributing boot volume datasets stored on a host computer system, the computer program product comprising one or more computer-readable tangible non-transitory storage devices and a plurality of program instructions stored on at least one of the one or more computer-readable tangible storage devices, the plurality of program instructions comprising:
   program instructions to store, by the host computer system, a boot volume dataset on a data storage device controlled by the host computer system, wherein the boot volume dataset comprises system files required by a designated client system to load an operating system, wherein the designated client system is registered with the host computer system according to a set of credentials;
   program instructions to receive, by the host computer system, a first request from the designated client system, the first request comprising a request to mount the boot volume dataset as a data volume on the designated client system, wherein the receiving is performed prior to the designated client system loading an operating system;

program instructions to verify, by the host computer system, the designated client system's authority to mount the requested boot volume dataset based on the set of credentials;

program instructions to mount, by the host computer system, the boot volume dataset as the data volume, the dataset after mounting behaving as native to the client system; and program instructions to process, by the host computer system, a second request from the designated client system, the second request comprising an input/output (I/O) request associated with the mounted dataset.

9. The computer program product of claim 8, wherein the host computer system runs a first operating system and the designated client system runs a second operating system.

10. The computer program product of claim 8, wherein the program instructions to process the second request further comprise program instructions to verify, by the host computer system, that a user of the designated client system requesting to perform an I/O operation has sufficient authority level.

11. The computer program product of claim 8, wherein the program instructions to mount the boot volume dataset as the data volume further comprise program instructions to update, by the host computer system, a virtualization table entry associating the dataset with the data volume.

12. The computer program product of claim 8, wherein the first request includes a parameter indicating a dataset name.

13. The computer program product of claim 8, wherein the first request includes a parameter indicating a predetermined value that may be mapped by the host computer system to a specific dataset.

14. The computer program product of claim 8, wherein the mounted dataset resides on a volume among datasets storing data in different formats.

15. A computer system for securely distributing boot volume datasets stored on a host computer system, the computer system comprising one or more processors, one or more computer-readable tangible storage devices, and a plurality of program instructions stored on at least one of the one or more storage devices for execution by at least one of the one or more processors, the plurality of program instructions comprising:

program instructions to store, by the host computer system, a boot volume dataset on a data storage device controlled by the host computer system, wherein the boot volume dataset comprises system files required by a designated client system to load an operating system, wherein the designated client system is registered with the host computer system according to a set of credentials;

program instructions to receive, by the host computer system, a first request from the designated client system, the first request comprising a request to mount the boot volume dataset as a data volume on the designated client system, wherein the receiving is performed prior to the designated client system loading an operating system;

program instructions to verify, by the host computer system, the designated client system's authority to mount the requested boot volume dataset based on the set of credentials;

program instructions to mount, by the host computer system, the boot volume dataset as the data volume, the dataset after mounting behaving as native to the client system; and program instructions to process, by the host computer system, a second request from the designated client system, the second request comprising an input/output (I/O) request associated with the mounted dataset.

16. The computer system of claim 15, wherein the host computer system runs a first operating system and the designated client system runs a second operating system.

17. The computer system of claim 15, wherein the program instructions to process the second request further comprise program instructions to verify, by the host computer system, that a user of the designated client system requesting to perform an I/O operation has sufficient authority level.

18. The computer system of claim 15, wherein the program instructions to mount the boot volume dataset as the data volume further comprise program instructions to update, by the host computer system, a virtualization table entry associating the dataset with the data volume.

19. The computer system of claim 15, wherein the first request includes a parameter indicating a dataset name.

20. The computer system of claim 15, wherein the first request includes a parameter indicating a predetermined value that may be mapped by the host computer system to a specific dataset.

21. The computer system of claim 15, wherein the mounted dataset resides on a volume among datasets storing data in different formats.

* * * * *